United States Patent
Akitomo

(10) Patent No.: US 8,988,314 B2
(45) Date of Patent: Mar. 24, 2015

(54) MULTI-DISPLAY SYSTEM

(75) Inventor: Kenji Akitomo, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 378 days.

(21) Appl. No.: 13/425,942

(22) Filed: Mar. 21, 2012

(65) Prior Publication Data

US 2012/0242893 A1 Sep. 27, 2012

(30) Foreign Application Priority Data

Mar. 23, 2011 (JP) ................. 2011-063742

(51) Int. Cl.
*G09G 5/00* (2006.01)
*G06F 3/14* (2006.01)

(52) U.S. Cl.
CPC ...... *G06F 3/1446* (2013.01); *G09G 2340/0407* (2013.01); *G09G 2356/00* (2013.01); *G09G 2370/20* (2013.01)
USPC .......................................................... 345/1.3

(58) Field of Classification Search
CPC .................... G09G 2300/02; G09G 2300/023; G09G 2300/026
USPC .................................................. 345/1.1–3.4
See application file for complete search history.

(56) References Cited

U.S. PATENT DOCUMENTS

| | | | |
|---|---|---|---|
| 6,583,771 B1 * | 6/2003 | Furuhashi et al. | 345/1.1 |
| 7,231,603 B2 * | 6/2007 | Matsumoto | 715/716 |
| 7,737,910 B2 | 6/2010 | Kulkarni et al. | |
| 8,606,949 B2 * | 12/2013 | Wogsberg et al. | 709/231 |
| 2002/0089518 A1 | 7/2002 | Shigeta | |

FOREIGN PATENT DOCUMENTS

| | | |
|---|---|---|
| EP | 1 202 162 A1 | 5/2002 |
| JP | 2002175068 A | 6/2002 |
| JP | 2002-196741 A | 7/2002 |
| JP | 2005-165335 A | 6/2005 |
| JP | 2008-269044 A | 11/2008 |
| JP | 2009-116274 A | 5/2009 |
| JP | 2009139492 A | 6/2009 |

* cited by examiner

*Primary Examiner* — Jimmy H Nguyen
(74) *Attorney, Agent, or Firm* — Keating & Bennett, LLP

(57) ABSTRACT

A multi-display system provided with display devices arranged to form a rectangular video display screen as a whole includes: distributors to which video signals are input; CPUs for detecting the number of input video signals; arrangement determining units for determining a display layout on the video display screen by looking-up a pre-set look-up table using the number of input video signals detected by the CPUs; and display units for displaying an input video image or images on the video display screen, in accordance with the determined display layout and the arrangement of display devices. Thus, the display layout of the multi-display system can automatically be changed in accordance with external environment.

2 Claims, 14 Drawing Sheets

MULTI-DISPLAY SYSTEM

CROSS-REFERENCE TO RELATED APPLICATION

This nonprovisional application claims priority under 35 U.S.C. §119(a) to Patent Application No. 2011-063742 filed in Japan on Mar. 23, 2011, the entire contents of which are hereby incorporated by reference.

BACKGROUND OF THE INVENTION

Field of the Invention

The present invention relates to a multi-display system and, more specifically, to a multi-display system capable of automatically changing display layout in accordance with the number of video signals input to the system, resolution of video images and positions of viewers or people around the system.

A multi-display system displaying a large video image by arranging a plurality of display devices has come to be widely used as a video display system of large screen. The multi-display system is used, for example, for advertisement on the street, exhibitions, and for providing information to audience at sports facilities.

Other than displaying one video image on a large screen, a multi-display system is capable of displaying a plurality of video images simultaneously, by determining a display layout in advance. The display layout cannot be determined simply by specifying video image to be displayed on each display device forming the multi-display system. The display layout is determined by additionally specifying magnification of each video image and a partial area of the enlarged video image to be displayed on each display device.

Japanese Patent Laying-Open No. 2008-269044 (hereinafter referred to as '044 Reference) discloses a display device of a large size in a shape of a table, which can be used as a conference table. In this device, the display screen of one large display device serves as a table surface, and display area is divided in accordance with the positions of users seated therearound to provide corresponding displays.

Japanese Patent Laying-Open No. 2002-196741 (hereinafter referred to as '741 Reference) discloses a display device for a portable computer that allows a user to change the size of display screen. These display devices, i.e., a plurality of flat panel devices, are connected to form a large display screen.

Japanese Patent Laying-Open No. 2005-165335 (hereinafter referred to as '335 Reference) discloses a scalable display system in which a plurality of small display devices are combined to form a large display. In this system, to each client (computer) controlling display on each small display device, a video image provided by dividing and re-formatting one video image is transmitted from an intermediate computer.

In a multi-display system, when a plurality of video images are to be displayed simultaneously, the display layout is manually determined in advance. Therefore, every time display conditions such as the number of video images to be displayed and the resolution are changed, a new display layout must be manually determined, which is troublesome. Further, it is difficult to flexibly coop with frequent changes of video images.

When a display device is used as a table, if a large display is used as in '044 Reference, it would be very expensive, and the size of practically realizable table would be limited. Thus, application of a multi-display system is considered. In that case, however, difficulty to flexibly change the display layout as described above poses a problem. For instance, if the multi-display system is used as a conference table, the display layout must be manually changed every time participants change. It is difficult to flexibly coop with the increase/decrease of the number of participants during a meeting.

The disclosures of '741 and '335 References are not for simultaneously displaying a plurality of video images. Therefore, the above-described problem cannot be solved by these techniques.

SUMMARY OF THE INVENTION

In view of the foregoing, it is desirable to provide a multi-display system capable of automatically changing the display layout in accordance with external environment including the number of input video signals, the resolution of video images and the position of viewers around the system.

According to an aspect, the present invention provides a multi-display system provided with a plurality of display devices, including: a receiving unit for receiving a plurality of input video signals; a display layout determining unit for determining, in accordance with the number of inputs as the number of the plurality of input video signals, or in accordance with position of input to the receiving unit of each of the plurality of input video signals, a display layout of video images generated from each of the plurality of input video signals, on a video display screen formed by the plurality of display devices; and a display unit for generating a video image from the plurality of input video signals and displaying the video image on the video display screen, in accordance with the determined display layout and arrangement information of the display devices.

Preferably, the display layout is determined by information specifying a video signal used for generating a video image displayed by each of the display devices, from the plurality of input video signals, information specifying, in a video image as a whole corresponding to the video signal used by each of the display devices, an area of the video image displayed by each of the display devices and information specifying magnification of the area of the video image displayed by each of the display devices.

More preferably, the multi-display system further includes a resolution detecting unit for detecting resolution of each of the plurality of input video signals. The display layout determining unit determines the display layout in accordance with the input position to the receiving unit of each of the plurality of video signals and order of the resolution of the plurality of video signals.

More preferably, the multi-display system further includes a person detecting unit for detecting a person near the video display screen formed by the plurality of display devices. The layout determining unit determines the display layout in accordance with the number of inputs and a position of the detected person in a plane parallel to the video display screen.

Preferably, the plurality of display devices are used with the video display screen formed by the plurality of display devices facing vertically upward. The receiving unit includes a plurality of individual receiving units each of which receives a video signal. When one video image is displayed on the video display screen as a whole, the number of the plurality of individual receiving units is the same as the number of display devices forming upper and lower ends of the image. Each of the plurality of individual receiving units is positioned close to the display device corresponding to each of the plurality of display devices forming the upper and lower ends. The display layout is determined such that a video image generated from the video signal input to the individual receiving device is displayed on an area including the display device corresponding to the individual receiving unit and one or a plurality of display devices adjacent to the display device and not having a video signal input to the individual receiving unit.

According to the present invention, in the multi-display system, a video image or video images can be displayed with the display layout changed automatically in accordance with external environment including the number of input video signals, the resolution of video images and the position of viewers around the system.

When the display screen of the multi-display system is arranged horizontally, positions of viewers or people therearound are detected, and the video images can be displayed with the corresponding display layout determined automatically. For instance, assume that at first the viewers are positioned only on one side of the multi-display system and one image is displayed using the video display screen as a whole, and then the viewers come to be positioned on both sides of the system. In such a situation, the display layout is automatically changed to divide the display screen into two, so that the viewers on both sides can see the same video in erected manner.

When the multi-display system is used as a conference table, it is possible to detect a person or persons seated around the table, and to display video images with the corresponding display layout determined automatically. Therefore, even if the number of participants increases/decreases or the seated positions of the viewers change during the meeting, video display can be changed flexibly.

Further, the multi-display system can be used as a table and video images freely input by a plurality of users can be displayed simultaneously. Here, using the display device in front of each user as a reference, the video image input by the user is also displayed on a display device to which no video signal is directly input from the outside. Therefore, largest possible video image can be displayed. Therefore, it is possible for the user to confirm details of the video image on a larger screen, in place of a smaller display screen of his/her portable computer or a portable terminal.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
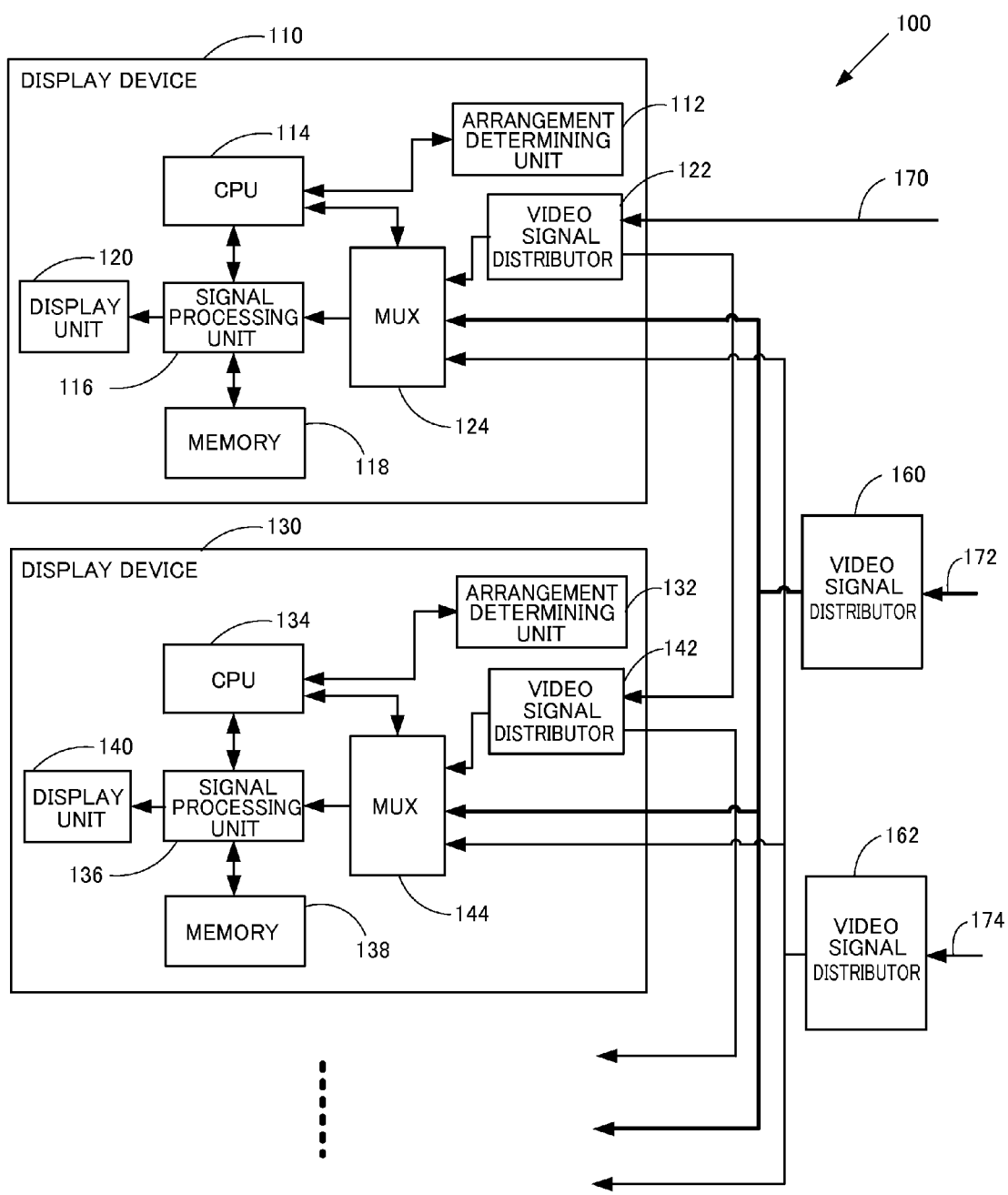
FIG. 1 is a block diagram schematically showing a configuration of a multi-display system in accordance with a first embodiment of the present invention.

In the following embodiments, the same components are denoted by the same reference characters. Their names and functions are also the same. Therefore, detailed description thereof will not be repeated.

Generally, there are two methods to display one video image on a multi-display system. In one method, on the side of video output, one video image is divided in accordance with a display arrangement (arrangement of a plurality of display devices), and to each display device, a video signal corresponding to its position is output. According to this method, each display device simply displays the input video image. In the other method, the video output side outputs one video signal to each display device. Specifically, one and the same video signal is input to each display device, and on the side of the display device, the input video image is divided, and the corresponding partial image is enlarged and displayed.

In the following, a multi-display system displaying video images in accordance with the latter method, in which the division is done on the side of the display devices, will be described. Further, in the descriptions related to the size of displayed video images, video images are also simply referred to as images.

First Embodiment

Figure 2:
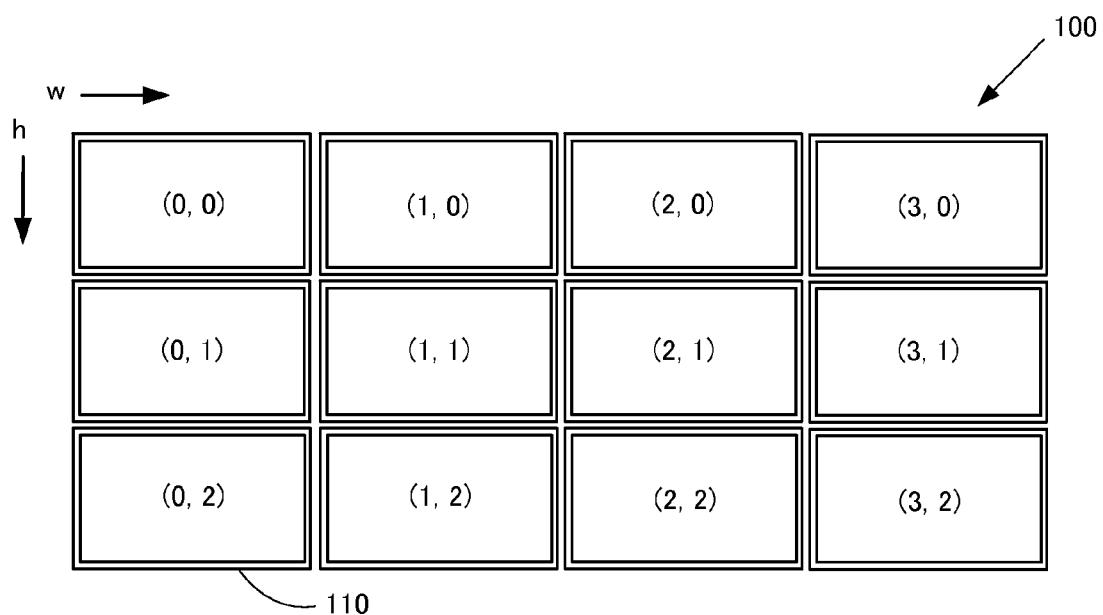
FIG. 2 shows an arrangement of display units of the multi-display system shown in FIG. 1.

Referring to FIG. 1, a multi-display system 100 in accordance with a first embodiment of the present invention includes a plurality of display devices 110 and 130, and video signal distributors (hereinafter referred to as distributors) 160 and 162 for distributing input video signals. FIG. 1 only shows two display devices 110 and 130 and two distributors 160 and 162 as representatives. A plurality of display devices 110 and 130 are arranged to form a rectangle as a whole, as shown in FIG. 2. In FIG. 2, a total of 12 display devices are arranged, that is, 3 in height×4 in width (h×w).

The plurality of display devices 110 and 130 respectively include: multi-display arrangement determining units (hereinafter referred to as arrangement determining units) 112 and 132; CPUs 114 and 134; signal processing units 116 and 136; memories 118 and 138; display units 120 and 140; distributors 122 and 142; and multiplexers (hereinafter denoted as MUX) 124 and 144.

Arrangement determining units 112 and 132 set display conditions for the video images to be displayed on display devices 110 and 130, respectively. Specifically, arrangement determining units 112 and 132 obtain video information (presence/absence of signal at each input port, video image size and the like) input to display devices 110 and 130, determine conditions such as the video image to be displayed on display devices 110 and 130, magnification, display start positions and the like, and transmit the determined conditions to CPUs 114 and 134. Arrangement determining units 112 and 132 obtain position information of viewers or persons around the multi-display system from a sensor, a camera or the like, and uses the information in association with the display conditions of video images to be displayed on the corresponding display devices 110 and 130.

CPUs 114 and 134 control signal processing units 116 and 136 and MUXs 124 and 144, in accordance with the information transmitted from arrangement determining units 112 and 132, respectively. Signal processing units 116 and 136 enlarge video images input to display devices 110 and 130, change display start positions and the like and generate signals suitable for input to display units 120 and 140, under the control of CPUs 114 and 134, respectively. Processing such as enlargement is executed by once storing input video signals in memories 118 and 138, and using parts of memories 118 and 138 as work areas.

Distributors 122, 142, 160 and 162 distribute input video signals to the plurality of display devices 110 and 130. Distributors 122, 142, 160 and 162 may have a signal amplifying function. Distributors 122 and 142 provided inside display devices 110 and 130 are 1-input, 2-output distributors, and transmit signals in daisy-chain manner to each other. Distributors 160 and 162 outside display devices 110 and 130 are 1-input, N-output distributors (N is the number of display devices) outputting signals to all display devices 110, 130 in parallel.

MUXs 124 and 144 select one of a plurality of input video signals (input ports) and output from output ports, or do not output any input video signal, under the control of CPUs 114 and 134, respectively. In each of MUXs 124 and 144, the same video signal is input to the same input port. By way of example, a video signal 170 is input to the first input port of each of MUXs 124 and 144 in daisy-chain manner. A video signal 172 is input to the second input port of MUXs 124 and 144, distributed by distributor 160. A video signal 174 is input to the third input port of each of MUXs 124 and 144, distributed by distributor 162.

Display units 120 and 140 are, for example, liquid crystal panels that display input signals from signal processing units 116 and 136 as video images.

In multi-display system 100, when one image as a whole (in the following, also referred to as one frame) is to be displayed on a plurality of display devices 110 and 130, signal processing units 116 and 136 determine areas to be displayed on the corresponding display devices 110 and 130, generate output signals using image data of the corresponding areas, and transmit the signals to display units 120 and 140. For instance, if one image as a whole is to be displayed by twelve display devices shown in FIG. 12, display device 110 divides the original image uniformly to 3×4 (h×w), enlarges three times in height and four times in width the image data corresponding to the 1/12 area at the lower left corner, and displays the result.

In the following, the function of automatically changing the display layout in accordance with the input signals in the present multi-display system 100 will be specifically described. Since each of display devices 110 and 130 has the same internal configuration, only the reference characters allotted to the components of display device 110 will be used as representatives.

(Function of Changing Display Layout in Accordance with the Number of Input Signals)

Figure 3:
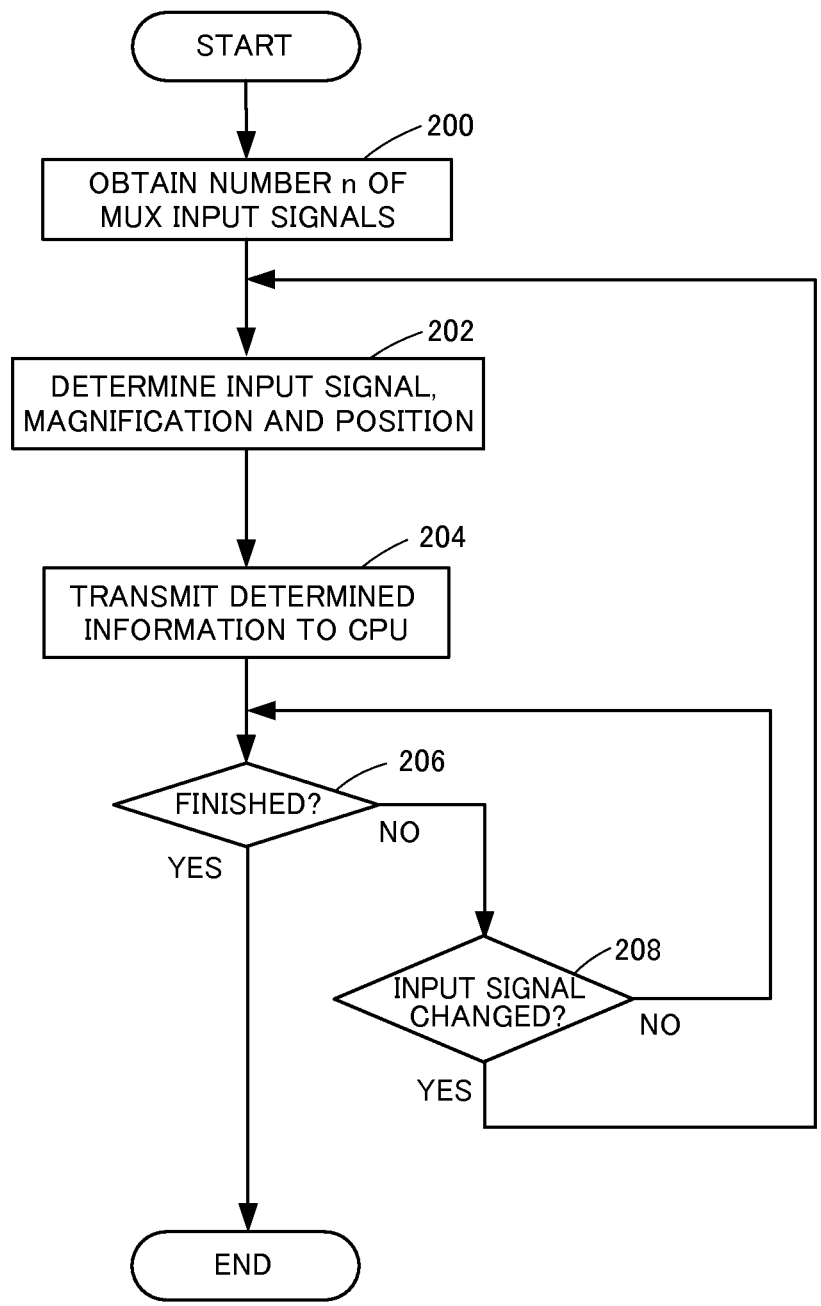
FIG. 3 is a flowchart representing a control structure of a program realizing the function of automatically changing a display layout in accordance with the number of input signals, in the multi-display system shown in FIG. 1.

A program for realizing the function of automatically changing the display layout in accordance with the number of input signals to MUX 124 will be described. FIG. 3 shows a process carried out by arrangement determining unit 112.

At step 200, arrangement determining unit 112 obtains the number n of video signals input to MUX 124 through CPU 114, and stores it in an internal storage (not shown). Specifically, arrangement determining unit 112 asks CPU 114 for the number of video signals input to MUX 124. In response, CPU 114 obtains the number of video signals input to MUX 124 from MUX 124, and transmits the value to arrangement determining unit 112.

At step 202, arrangement determining unit 112 determines, from the number n of input signals obtained at step 200, the video signal (input port) to be output from the corresponding MUX 124, magnification of the video image, and the area of partial data to be used on the image data of one frame.

By way of example, assume that the display arrangement shown in FIG. 2 (h×w=3×4 devices) is used. If the number of input signals to MUX 124 is 1, it follows that an image of one frame is displayed on 12 devices. If the number of input signals to MUX 124 is 2 and images of two frames are to be displayed on left and right sides, one frame of one image is displayed on six devices on the left, and one frame of the other image is displayed on six devices on the right. Information as to which display device is allocated to which video signal in accordance with the number of input signals is determined beforehand in consideration of display arrangement, and stored, for example, in the form of a look-up table or tables in a non-volatile storage in arrangement determining unit 112. Therefore, if the number n of inputs is determined, the magnification of each video image is specified. Further, the signal of which input port of MUX 124 is to be used by each display device 110 and which part of data of the enlarged frame is to be used are also specified.

In the following, the stored look-up tables will be represented as Input (m, w, h), Enlarge (m, w, h) and Position (m, w, h). Here, m represents the number of input signals to MUX 124, and w and h represent the position along the height and width of the display arrangement, respectively. Therefore, m, w and h are each an integer not smaller than 0. The values w and h are set, for example, as shown in FIG. 2. FIG. 2 shows display devices with corresponding values (w, h). Arrangement determining unit 112 each stores the values (w, h) that identifies itself.

Input (m, w, h) represents information for specifying which of the video signals input to MUX 124 is to be used. Specifically, the value Input (m, w, h) of the table specified by m, w and h is used by the display device 110 corresponding to (w, h) to specify the input port of MUX 124. Input (m, w, h) is, for example, an input port number.

Enlarge (m, w, h) represents information for specifying magnification of the video image. Specifically, the value Enlarge (m, w, h) of the table specified by m, w and h is used by the display device 110 corresponding to (w, h) as the magnification of the input video image.

Position (m, w, h) represents information for specifying a partial area to be displayed by each display device, on the original image before enlargement. Specifically, the value Position (m, w, h) of the table specified by m, w and h is used by the display device corresponding to (w, h) as the information specifying the area the device is to display. Since one original image is to be divided and displayed on a plurality of display devices (enlarged display), Position (m, w, h) represents coordinates of a representative point (for example, upper left point) of a rectangular area corresponding to each display device, of the one original image.

At step 204, arrangement determining unit 112 transmits the pieces of information (Input (m, w, h), Enlarge (m, w, h)

and Position (m, w, h)) determined at step 202 to CPU 114. In response, CPU 114 controls MUX 124 to output the signal of the input port corresponding to Input (m, w, h). Further, CPU 114 sets Enlarge (m, w, h) as the magnification, and sets Position (m, w, h) as the position information of the area to be displayed, of the input video image. Using these values, signal processing unit 116 enlarges a part of the video data input from MUX 124 on a memory, and generates signals to be output to display unit 120 from the enlarged video data.

At step 206, arrangement determining unit 112 determines whether or not the program is to be terminated. If an instruction to end is received, the program ends. Otherwise, the control proceeds to step 208.

At step 208, arrangement determining unit 112 determines whether or not the input signal to MUX 124 has been changed. Specifically, arrangement determining unit 112 obtains the number n of video signals input to MUX 124 as at step 200, and determines whether or not the number has changed from the value obtained and stored last time. If it is determined to be not changed, the control returns to step 206. If it is determined to be changed, the control returns to step 202, at which arrangement determining unit 112 refers to the look-up table using the new number n of inputs, and repeats the process of steps 202 to 206.

As described above, it is possible for arrangement determining unit 112 to refer to the preset look-up tables in accordance with the number n of input signals to MUX 124 and to automatically determine the display conditions of each display device 110 accordingly.

Figure 4:
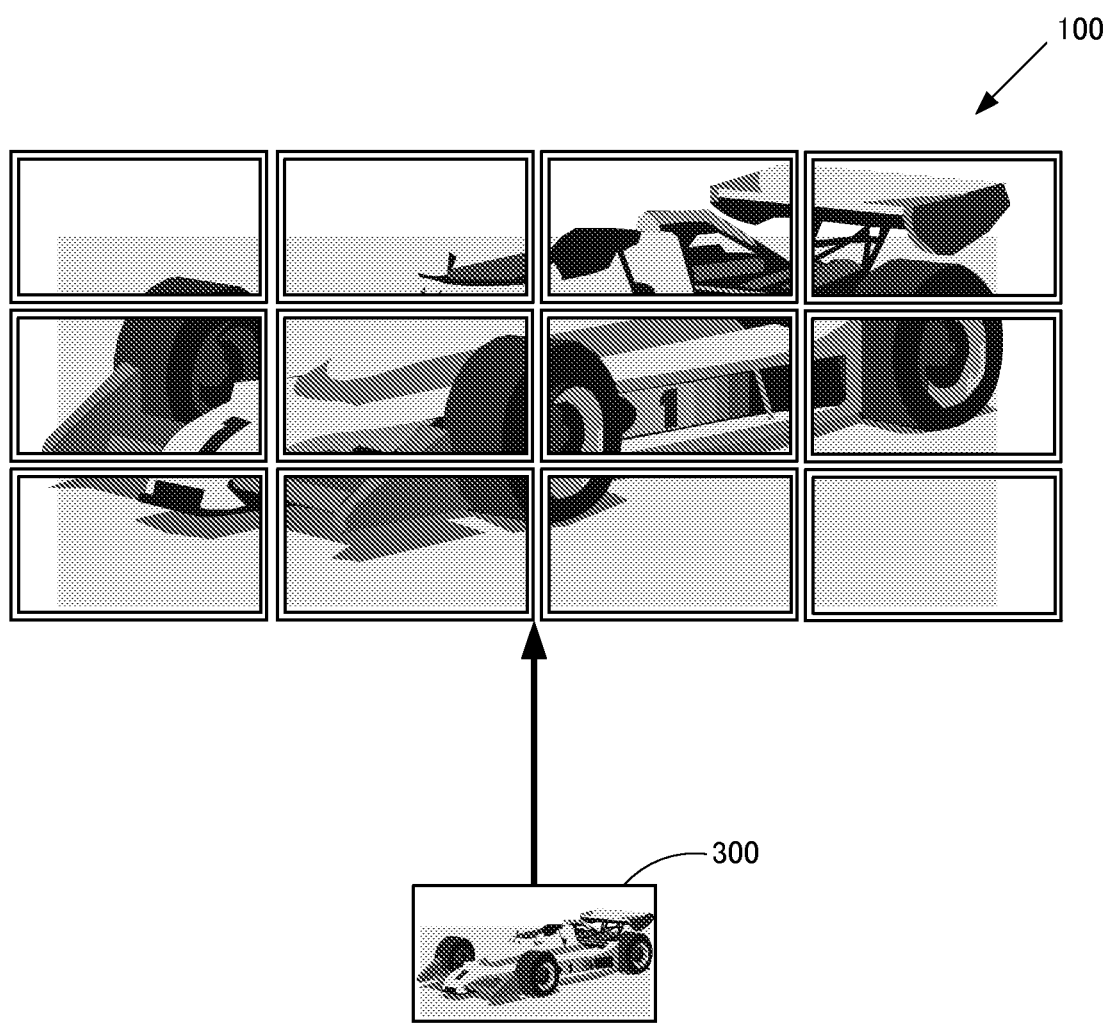
FIGS. 4 to 7 show exemplary images displayed on the multi-display system.

FIG. 4 shows an exemplary display on multi-display system 100 when the signal of one video image 300 is input to MUX 124. Here, video image 300 is displayed on the display screen as a whole of multi-display system 100.

The corresponding look-up tables Input (1, w, h), Enlarge (1, w, h) and Position (1, w, h) here are as follows. Input (1, w h) will always have the value "1" (representing the first input port) regardless of the values (w, h). Enlarge (1, w, h) is always the data representing the magnification of three times in height and four times in width, regardless of the values (w, h). Position (1, w, h) is the data that corresponds to (w, h) and represents coordinate values (pixel unit) at an upper left point of each rectangle obtained when one frame of the image is divided to h×w=3×4.

Figure 5:
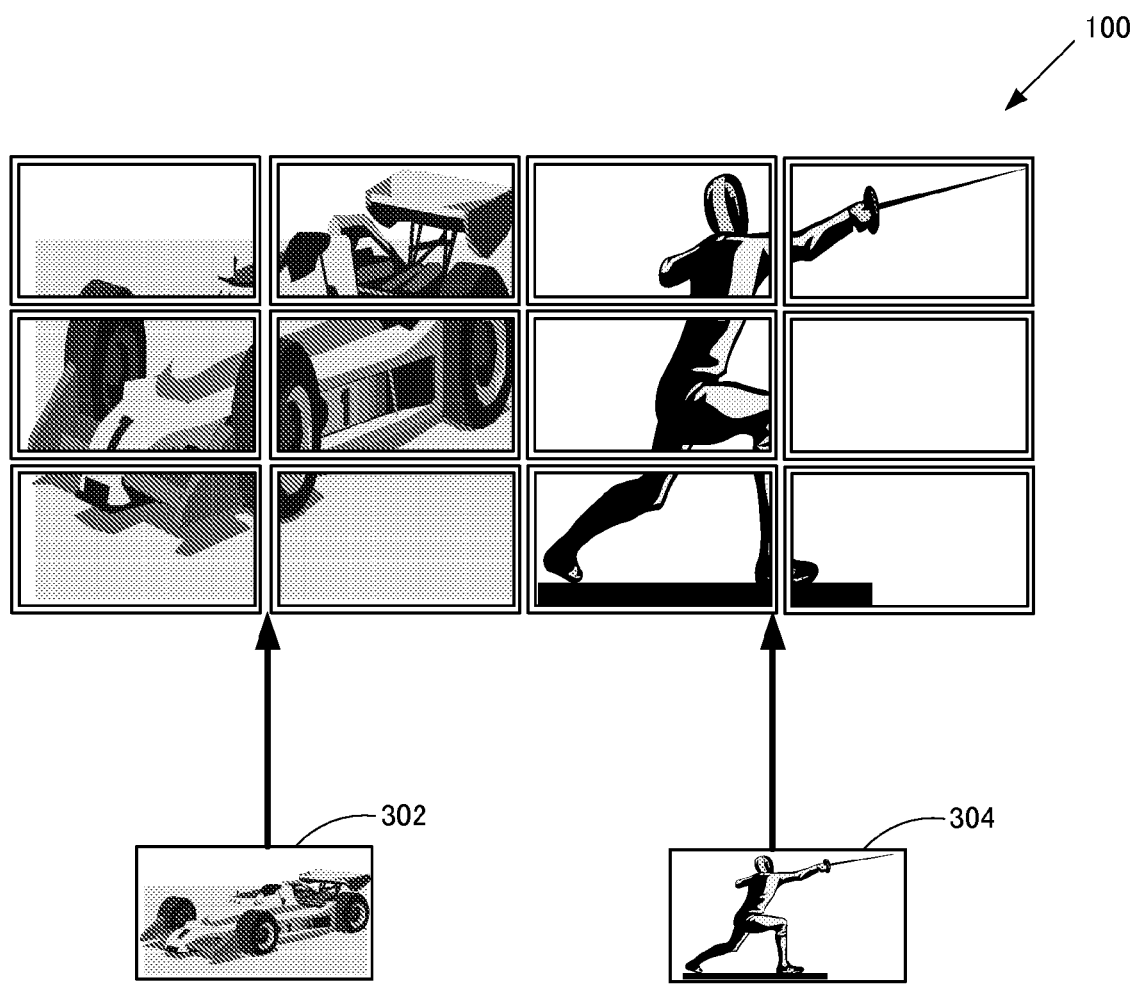

FIG. 5 shows an exemplary display on multi-display system 100 when signals of two video images 302 and 304 are input to the first and second input ports of MUX 124. Here, the display screen of multi-display system 100 is divided into two, and video images 302 and 304 are displayed thereon.

Here, the corresponding look-up tables Input (2, w, h), Enlarge (2, w, h) and Position (2, w, h) are as follows. Input (2, w, h) (where w=0 or 1, h=0 to 2) will always be "1" (representing the first port) regardless of the value h, while Input (2, w, h) (where w=2 or 3, h=0 to 2) is always "2" (representing the second input port) regardless of the value h. Enlarge (2, w, h) is always the data representing the magnification of three times in height and two times in width, regardless of the values (w, h). Position (2, w, h) is the data that corresponds to (w, h) and represents coordinate values (pixel unit) at an upper left point of each rectangle obtained when one frame of the original image is divided to h×w=3×2. Since the display screen of multi-display system 100 is divided into two to the left and right, Position (2, 0, h) and Position (2, 2, h) represent the same data. Further, Position (2, 1, h) and Position (2, 3, h) represent the same data.

Figure 6:
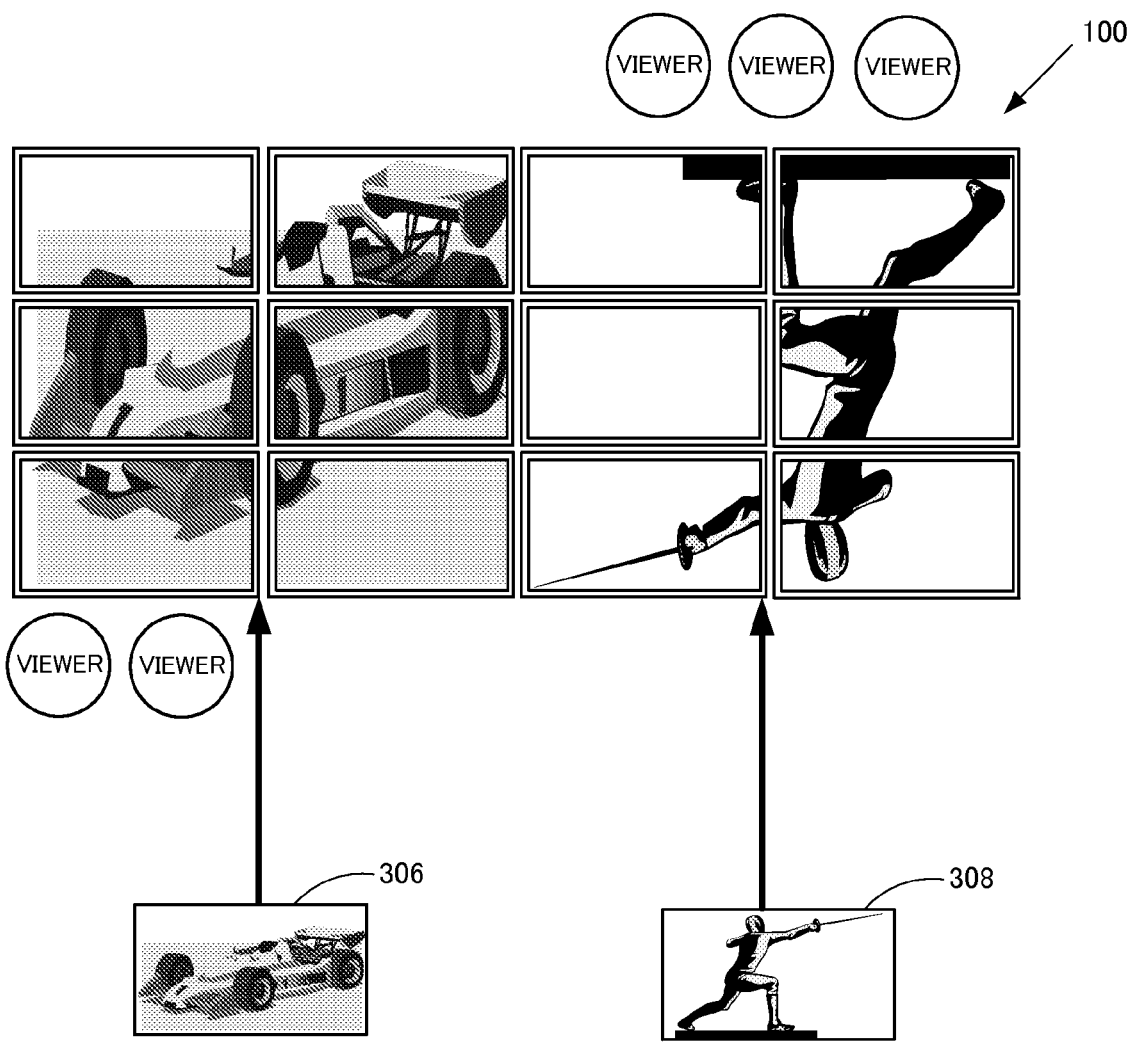

The display screen of multi-display system 100 can be placed horizontally. FIG. 6 shows an exemplary display of multi-display system 100 when signals of two video images 306 and 308 are input to MUX 124. Here, the display screen of multi-display system 100 is divided into two, and video images 306 and 308 are displayed with the direction of displaying video images made opposite to each other.

The values of corresponding look-up tables Input (2, w, h) and Enlarge (2, w, h) here may be set to the same values as in the example of FIG. 5. On the other hand, Position (2, w, h) must include information to display video images 306 and 308 in opposite directions (one will be referred to as erected image, the other as inverted image). By way of example, Position (2, 0, h) and Position (2, 1, h) may be the same data as in the example of FIG. 5, and Position (2, 2, h) and Position (2, 3, h) may be the data of FIG. 5 with negative signs added. If Position represents negative data (coordinates), the coordinates with the negative sign removed are interpreted as the coordinates using the lower right point of the original image as the origin. Thus, a rectangle area having the coordinate point as the lower right point is regarded as the object of processing and enlargement process and rotation by 180 degrees are executed on memory 118.

The values of corresponding look-up tables Input (2, w, h) and Position (2, w, h) may be set to the same values as in the example of FIG. 5. In that case, information to display video images 306 and 308 in opposite directions may be included in Enlarge (2, w, h). For example, Enlarge (2, 0, h) and Enlarge (2, 1, h) may have the same values as in FIG. 5, and Enlarge (2, 2, h) and Enlarge (2, 3, h) may be set to values of FIG. 5 with negative signs added. If Enlarge has a negative value, the coordinates are interpreted in the similar manner as described above, and rotation by 180 degrees is executed.

Alternatively, information for displaying video images 306 and 308 in opposite directions may be provided separately.

With the look-up tables set in this manner, by the process described with reference to FIG. 3, the display layout of multi-display system 100 with the display screen placed horizontally automatically becomes as shown in FIG. 6. Therefore, it is possible for the viewers therearound to view one erected video image from each of two directions. The video images 306 and 308 may be the same video image.

Figure 7:
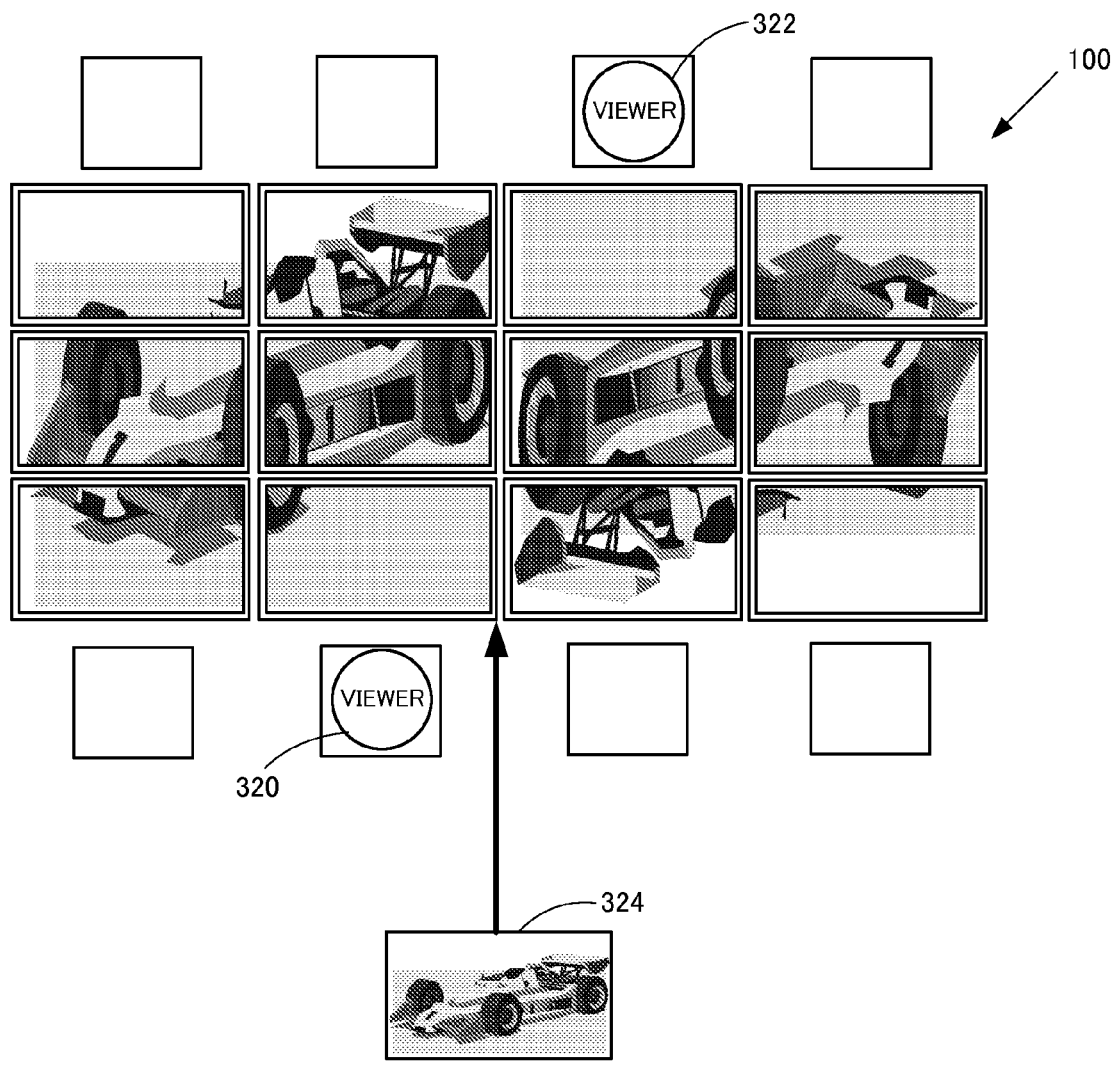

When the display screen of multi-display system 100 in accordance with the present embodiment is arranged horizontally, it may be possible to detect viewers or people therearound by a camera or the like and to change the display layout in accordance with the result of detection. By way of example, a viewer or person may be detected by picking-up images around multi-display system 100 by a camera and performing image processing such as motion detection on the resulting images, to find a viewer or a person. For instance, if viewers are found on both upper and lower sides of multi-display system 100 shown in FIG. 6, the video images may be displayed in the manner as shown in FIG. 6, and if viewers are detected only on one side, the two video images may be displayed erected in the direction viewed from the detected viewers (see FIG. 5). Alternatively, if one video image is displayed and viewers are detected only on one side, the one video image may be displayed on the full screen as shown in FIG. 4, and if viewers are detected on both sides, one same image may be displayed in the manner as shown in FIG. 6. In such situations, arrangement determining unit 112 may change the look-up tables to be looked up, in response to the detection of viewers When the display screen of multi-display system in accordance with the present embodiment is arranged horizontally to be used as a conference table, the display layout may be changed in accordance with positions of seated viewers or persons. FIG. 7 shows an exemplary display on multi-display system 100 when a signal of one video image 324 is input to MUX 124 and two viewers or persons 320 and 322 are seated. Squares on upper and lower portions of multi-display system 100 represent chairs.

Specifically, the state of seating of viewers or persons on the seats arranged corresponding to respective display devices are detected by means of a camera, a sensor or the like, and arrangement determining unit 112 may change the look-up table or tables to be looked-up in accordance with the result of detection. If a camera is used, detection is possible by image processing similar to that described above. If a sensor is used, a pressure sensor or the like may be positioned on the seat or back of each chair and a signal from the sensor may be received by each arrangement determining unit 112. If viewers or persons are seated as shown in FIG. 7, the same look-up tables as in the example of FIG. 6 may be used. Thus, viewers or persons seated opposite to each other can view the erected video image from respective directions and, this facilitates efficient discussions and exchange of opinions.

(Function of Changing Display Layout in Accordance with the Resolution of Input Signals)

Figure 8:
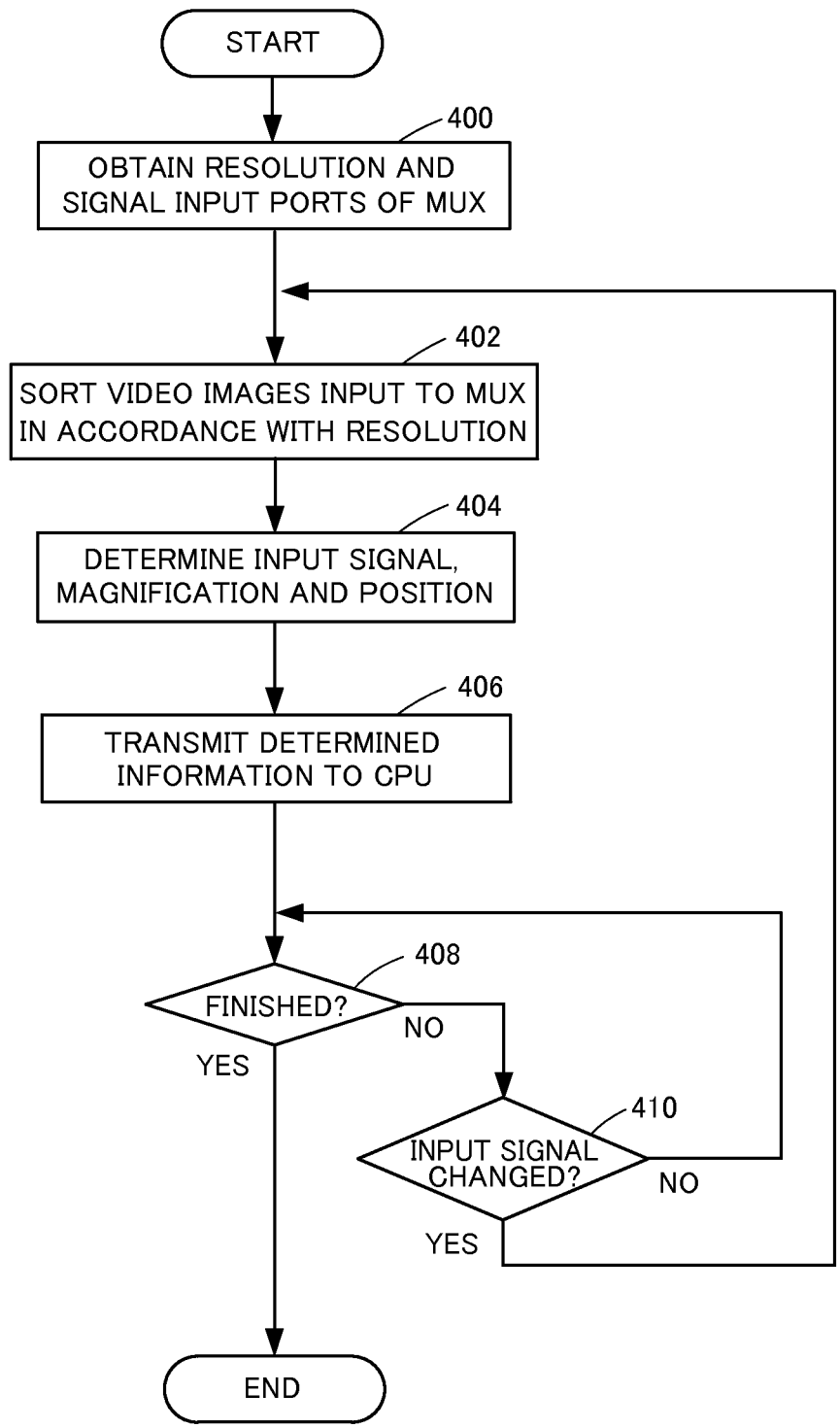
FIG. 8 is a flowchart representing a control structure of a program realizing the function of automatically changing a display layout in accordance with the resolution of input signals, in the multi-display system shown in FIG. 1.

The function of automatically changing the display layout in accordance with the resolution of input signals to MUX 124 will be described. FIG. 8 shows a process carried out by arrangement determining unit 112.

At step 400, arrangement determining unit 112 obtains information of input port of the video signals input to MUX 124 and information of resolution of the input signals through CPU 114, and stores in an internal storage. Specifically, arrangement determining unit 112 asks CPU 114 for these pieces of information and, in response, CPU 114 obtains, from MUX 124, the pieces of information of the input port to which the signals are input and the resolution of each input signal, establishes correspondence between these pieces of information and transmits the results to arrangement determining unit 112.

Known technique may be used to specify the resolution. The video signals are generated in accordance with known standards. By way of example, by detecting a vertical synchronizing signal of the input signal to MUX 124, the resolution can be specified. Detection of resolution may be done either by MUX 124 or CPU 114.

At step 402, arrangement determining unit 112 sorts the pieces of information obtained at step 400 in accordance with the resolution (starting from the highest resolution or lowest resolution). Thus, input ports of MUX 124 are sorted in an order corresponding to the resolution of input video images.

By way of example, assume that MUX 124 has three input ports P1 to P3, and corresponding signals have resolutions A1 to A3. Then, arrangement determining unit 112 obtains (P1, A1) to (P3, A3). If the resolutions are A2, A1 and A3 when arranged from the highest, the input ports when sorted in accordance with the resolution from the highest will be P2, P1 and P3 (hereinafter this will also be referred to as order information). It is noted that in each MUX 124, the same video signal is input to the input port having the same number.

At step 404, arrangement determining unit 112 determines the video signal (that is, corresponding input port number) to be output from MUX 124, magnification of the video image, and the area of partial data to be used of the original image, using the order information of input ports determined at step 402. In the manner similar to that described with reference to FIG. 3, arrangement determining unit 112 determines these with reference to the preset look-up tables.

As in the case of FIG. 3, the look-up tables stored beforehand will be represented by Input (m, w, h), Enlarge (m, w, h) and Position (m, w, h). The meanings of m, w, h, Enlarge (m, w, h) and Position (m, w, h) are the same as those described with reference to FIG. 3. Therefore, Enlarge (m, w, h) and Position (m, w, h) used for the example of FIG. 3 may be used here.

Different from the example of FIG. 3, here, Input (m, w, h) represents information for specifying the input video image of which order of resolution is to be displayed on the display device corresponding to (w, h). Input (m, w, h) has an integer value (such as "1", "2" or "3") representing the order. If Input (m, w, h)=0, it means the no video image is displayed on the display device specified by (w, h).

Arrangement determining unit 112 provided for display device 110 specified by (w, h) specifies an input port positioned in the order corresponding to the integer value of Input (m, w, h), from the array of input ports (order information) sorted in accordance with the resolution at step 402. By way of example, if m=3 and the sorting is from the highest resolution, the value Input (3, w, h) of "1" means that the video image having the highest resolution is to be displayed, the value "2" means that the video image having the second highest resolution is to be displayed, and the value "3" means that the video image having the third highest resolution is to be displayed. Each arrangement determining unit 112 determines the input port number in accordance with the value ("1", "2" or "3") of Input (3, w, h), of the order information of input ports after sorting. If the order information is P2, P1 and P3 and the value Input (3, w, h) is "1", arrangement determining unit 112 provided for display device 110 specified by (w, h) determines the input port number P2 as the input port of the signal output from MUX 124. If the value Input (3, w, h) is "2", arrangement determining unit 112 provided for display device 110 specified by (w, h) determines the input port number P1 as the input port of the signal output from MUX 124. The determined input port number will be represented by Cony (m, w, h).

At step 406, arrangement determining unit 112 transmits the information (Cony (m, w, h), Enlarge (m, w, h) and Position (m, w, h)) determined at step 402 to CPU 114. In response, CPU 114 controls MUX 124 such that the signal of the input port corresponding to Cony (m, w, h) is output. Further, CPU 114 sets Enlarge (m, w, h) as the magnification in signal processing unit 116, and sets Position (m, w, h) as the position information of the area to be displayed of the input video image. Using these values, signal processing unit 116 enlarges part of the video data input from MUX 124 on the memory, and generates a signal to be output to display unit 120 from the enlarged video data.

At step 408, arrangement determining unit 112 determines whether or not the program is to be terminated. If an instruction to end is received, the program ends. Otherwise, the control proceeds to step 410.

At step 410, arrangement determining unit 112 determines whether or not there is any change in the input signal of MUX 124. Specifically, arrangement determining unit 112 obtains pieces of information of the input port of video signals input to MUX 124 and resolution of input signals in the similar manner as at step 400, and determines whether or not the values have changed from the values obtained and stored last time. If the values are determined to be not changed, the control returns to step 408. If the values are determined to be changed, the control returns to step 402, and arrangement determining unit 112 repeats the process of steps 402 to 408 with reference to the look-up tables using the new pieces of information of video signal input port and the resolution of input signal.

As described above, it is possible for arrangement determining unit 112 to refer to the preset look-up tables in accordance with the pieces of information related to the input port of video signals input to MUX 124 and to the resolution of input signals, and to automatically determine the display conditions of each display device 110 accordingly.

Figure 9:
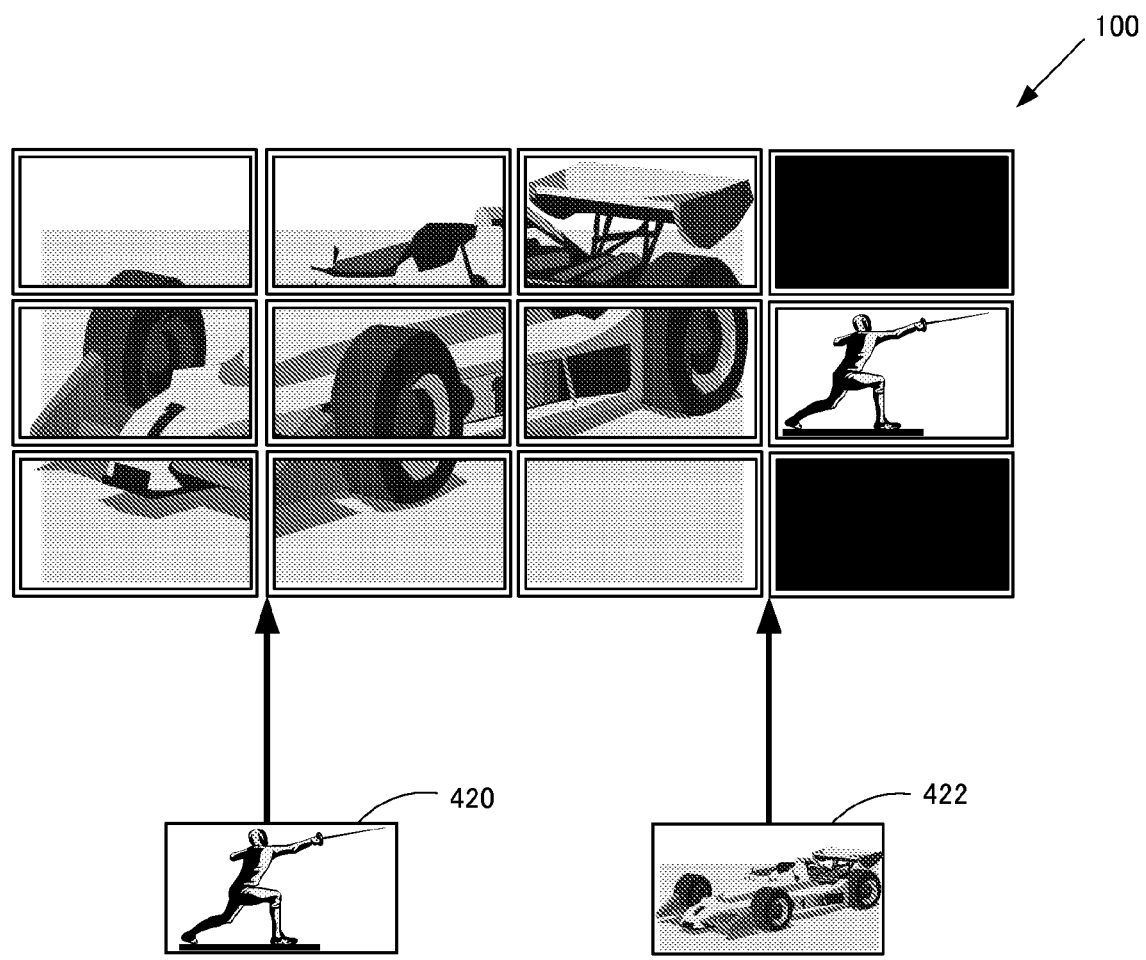
FIG. 9 shows an exemplary image displayed on the multi-display system.

FIG. 9 shows an exemplary display on multi-display system 100 when signals of two video images 420 and 422 are input to MUX 124. Here, assume that video image 420 is input to the first input port of MUX 124 and video image 422 is input to the second input port of MUX 124. Further, it is assumed that video image 422 has higher resolution (for example, width×length=1920×1080 pixels) than video image 420 (for example, width×length=640×480 pixels).

In order to realize such a layout as shown in FIG. 9, the look-up tables should be set as follows. Input (2, w, h) (w=0 to 2, h=0 to 2) will always have the value "1" (representing the video image of highest resolution) regardless of the values (w, h), Input (2, 3, 2)=2 (representing the video image of second highest resolution), and Input (2, 3, 0)=Input (2, 3, 3)=0 (representing that video image is not displayed).

Enlarge (2, w, h) (w=0 to 2, h=0 to 2) is always the data representing the magnification of three times in height and three times in width, regardless of the values (w, h), while Enlarge (2, 3, 1)=1, and Enlarge (2, 3, 0)=Enlarge (2, 3, 2)=0 (representing that video image is not displayed).

Position (2, w, h) (w=0 to 2, h=0 to 2) is the data that corresponds to (w, h) and represents coordinate values (pixel unit) at an upper left point of each rectangle obtained when one frame of the original image (video image 420) is divided to h×w=3×3. Position (2, 3, 1) represents positional coordinates of the upper left point of the original image (video image 422). Position (2, 3, 0) and Position (2, 3, 2) may have any values since these values correspond to the display devices on which no video image is displayed.

By inputting the signals of video images 420 and 422 to the same input ports of each MUX 124 and by executing the process shown in the flowchart of FIG. 8 using such look-up tables, the display shown in FIG. 9 can be realized in multi-display system 100.

Second Embodiment

A multi-display system 500 in accordance with the second embodiment of the present invention is used as a table with the display screen arranged horizontally, and its display layout is automatically changed in accordance with the position where the video signal is input.

Figure 10:
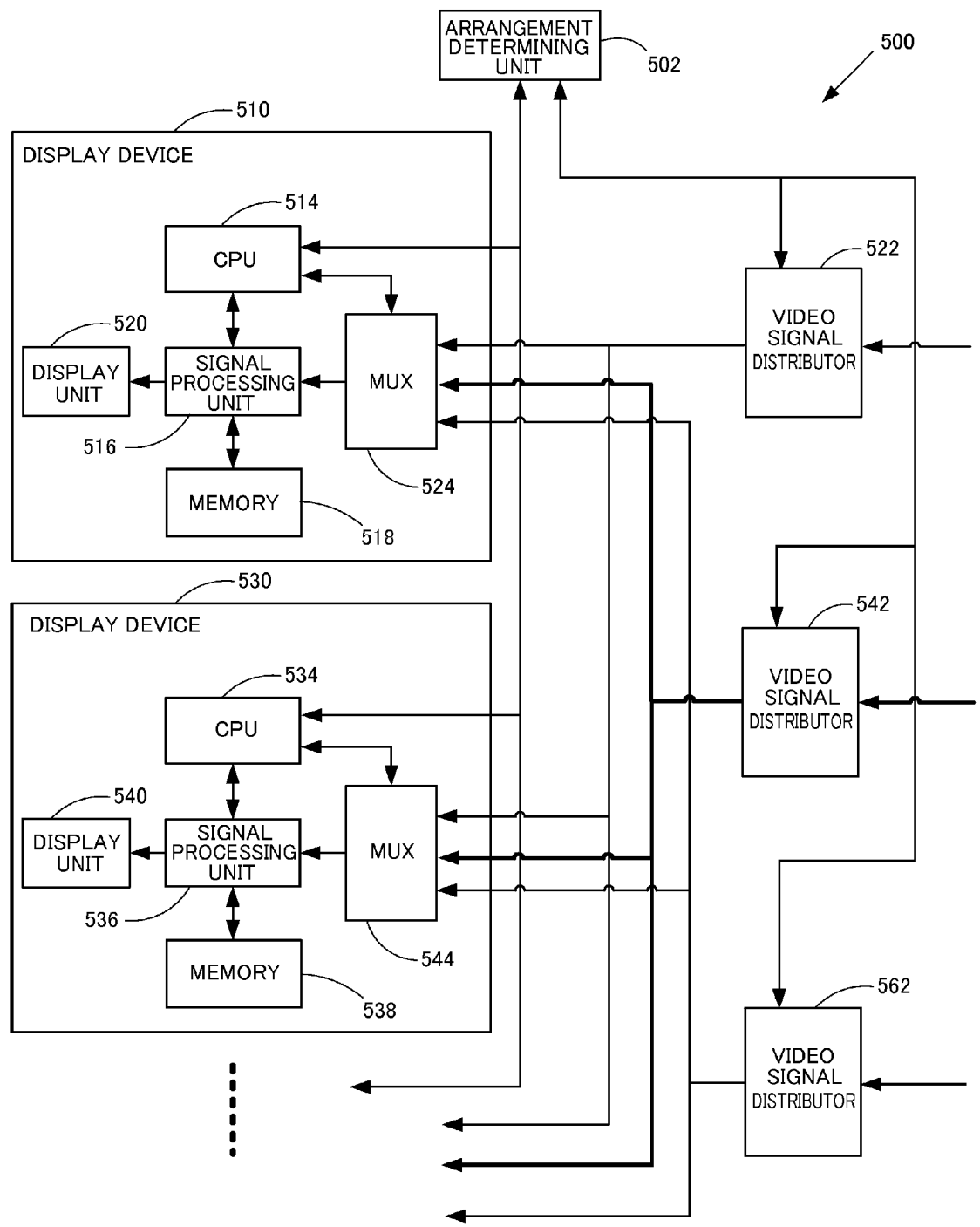
FIG. 10 is a block diagram schematically showing a configuration of the multi-display system in accordance with a second embodiment of the present invention.

Referring to FIG. 10, multi-display system 500 in accordance with the present embodiment includes a plurality of display devices 510 and 530, and video signal distributors (hereinafter referred to as distributors) 522, 542 and 562 for distributing input video signals. FIG. 10 only shows two display devices 510 and 530 and three distributors 522, 542 and 562 as representatives. A plurality of display devices 510 and 530 are arranged to form a rectangle as a whole, as shown in FIG. 2. Since the configuration of multi-display system 500 is similar to that of multi-display system 100, only the difference will be described, and the description of the same components will not be repeated.

Since each of display devices 510 and 530 has the same internal configuration, only the reference characters allotted to the components of display device 510 will be used as representatives. Since distributors 522, 542 and 562 are equivalent in the system configuration of multi-display system 500, in the following, distributor 522 will be described as a representative of these.

Though arrangement determining units 112, 132 are provided in respective display devices in multi-display system 100, in multi-display system 500, the arrangement determining unit is not provided in each display device but one arrangement determining unit 502 is provided for the entire multi-display system 500. Each display device 510 is not provided with the video distributor for distributing the video images in daisy-chain manner. Distributor 522 is provided outside of the display device, and it distributes input signals to all display devices 510 in parallel.

Multi-display system 500 has its display screen arranged horizontally. The distributors 522 are provided in the same number as the number of display devices 510 forming upper and lower two sides (two sides corresponding to the upper and lower ends of the video image when the video image is displayed on the whole screen) of multi-display system 500. Distributors 522 are each in one-to-one correspondence with the display devices 510 forming the upper and lower two sides. For example, referring to FIG. 2, here the number of distributors 522 is the same as the number of display devices (8) specified by (w, h) (w=0 to 3,h=0 or 2). A signal input terminal of distributor 522 is arranged close to the display device 510 that is in one-to-one correspondence. Each of users inputs video signal output from his/her own portable computer, portable terminal or the like to the signal input terminal, to use multi-display system 500.

Figure 11:
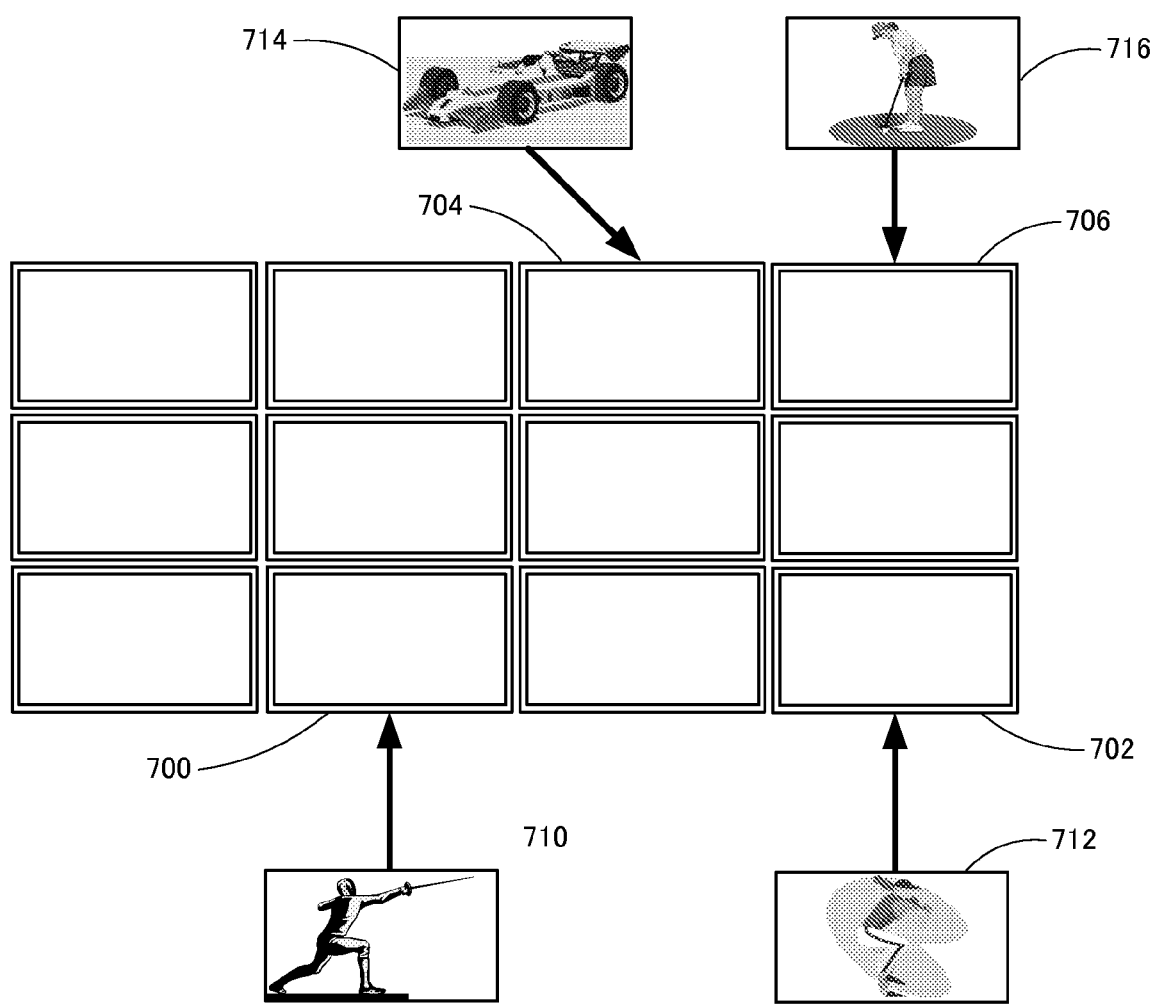
FIG. 11 shows an example of video inputs to the multi-display system shown in FIG. 10.

In the following, the function of automatically changing the display layout in accordance with the input position of video signal (position of input terminal of the distributor) in multi-display system 500 will be described. Here, it is assumed that four video signals are input, as shown in FIG. 11. Specifically, a video image 710 is input to the distributor for a display device 700 specified by (1, 2); a video image 712 is input to the distributor for a display device 702 specified by (3, 2); a video image 714 is input to the distributor for a display device 704 specified by (2, 0); and a video image 716 is input to the distributor for a display device 706 specified by (3, 0). Further, it is assumed that serial numbers are allocated to distributors 522 and, specifically, numbers 1 to 4 are allocated to the distributors corresponding to the display devices specified by (i, 2) (i=0 to 3) and numbers 5 to 8 are allocated to the distributors corresponding to the display devices specified by (i, 0), (i=0 to 3). Specifically, in FIG. 11, "2" is allocated to the input terminal of distributor corresponding to display device 700, "4" is allocated to the input terminal of distributor corresponding to display device 702, "7" is allocated to the input terminal of distributor corresponding to display device 704, and "8" is allocated to the input terminal of distributor corresponding to display device 706. These numbers also correspond to the numbers of input ports of MUX 524. Specifically, the video signal input from n-th distributor to each MUX is input to the n-th input port of each MUX.

Arrangement determining unit 502 determines which of the plurality of video signals input from the outside is to be displayed on each display device 510, and accordingly transmits pieces of information related to the input port selected at MUX 524, the area of image as the object of display, and magnification of the image to CPU 514 of each display device 510.

Figure 12:
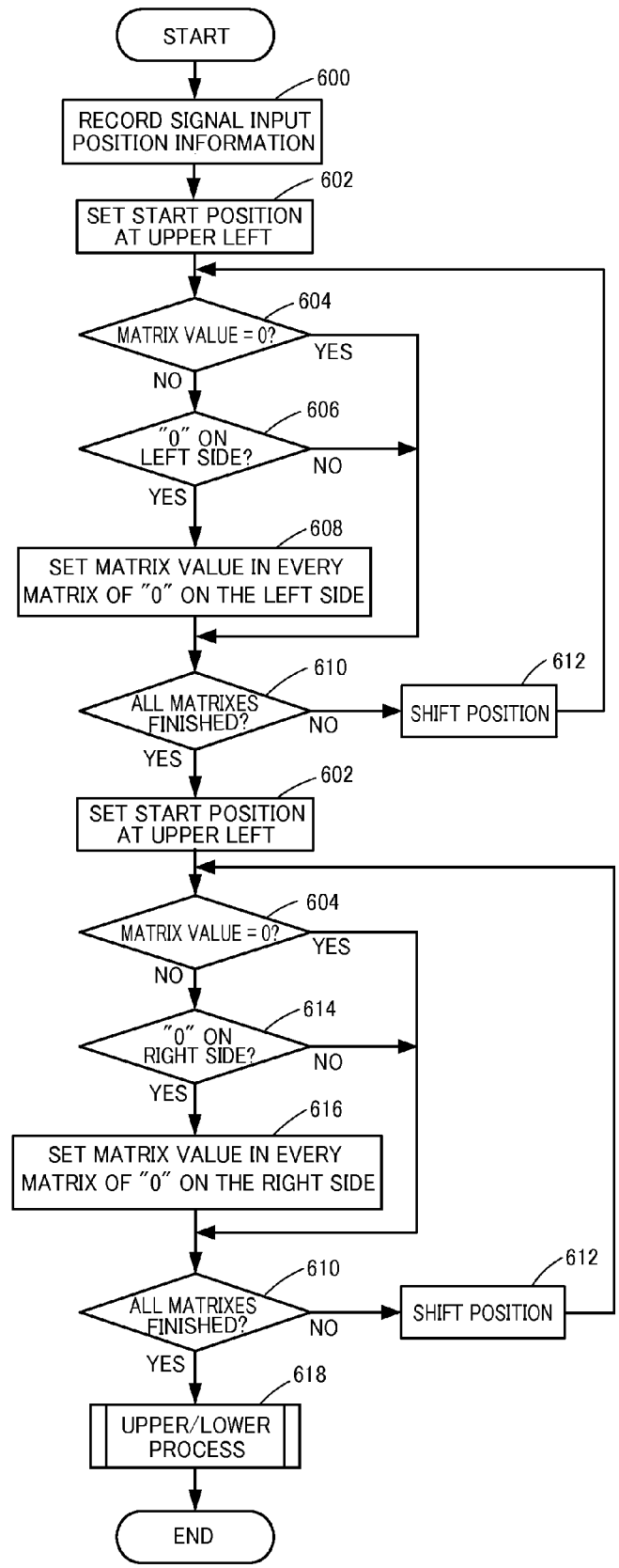
FIG. 12 is a flowchart representing a control structure of a program realizing the function of automatically changing a display layout in accordance with the position of input signals, in the multi-display system shown in FIG. 10.

First, referring to FIG. 12, the control structure of the program for determining the display layout carried out by arrangement determining unit 502 will be described. At step 600, arrangement determining unit 502 determines whether or not a video signal is input to each distributor 522. Arrangement determining unit 502 writes a value in accordance with the result of determination to a corresponding position (matrix element) of a matrix (having initial value "0" set in every matrix element) secured in advance on a storage corresponding to the display arrangement of multi-display system 500.

Figure 13:
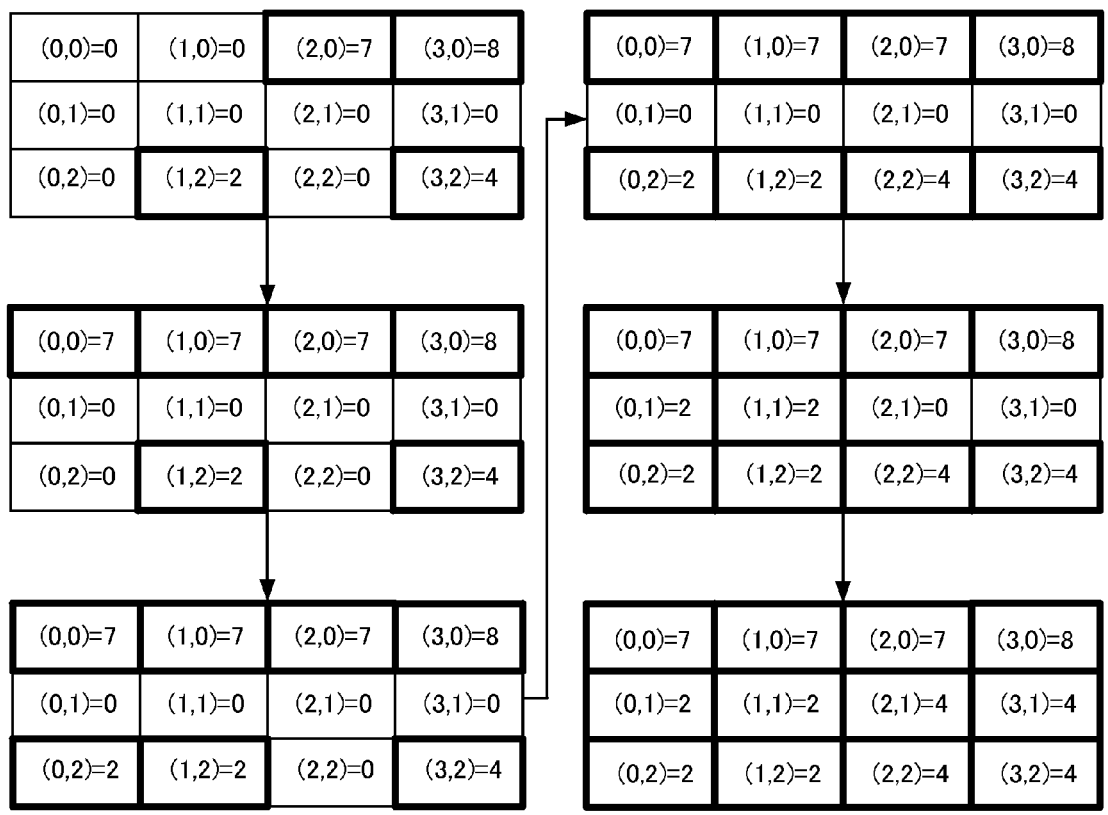
FIG. 13 shows a process how the matrix representing the display layout is determined.

Specifically, if a signal is input to a distributor, arrangement determining unit 502 writes a number attached to the distributor, in the corresponding matrix element. In the example shown in FIG. 11, values such as shown on the upper left side of FIG. 13 are input to the matrix.

At step 602, arrangement determining unit 502 sets a start position of repetition process, that is, a display device to be the first object of processing. Specifically, it sets (0, 0), to designate the display device at the upper left corner.

At step 604, arrangement determining unit 502 determines whether or not the value of matrix element as the object of processing (if step 604 is executed for the first time, the matrix element set at step 602) is "0". If it is determined to be "0", the control proceeds to step 610. If it is determined not to be "0", the control proceeds to step 606.

At step 606, arrangement determining unit 502 determines whether or not there is a matrix element having the value "0" on the left side of the matrix element as the object of processing. If there is no matrix element of "0", the control proceeds to step 610. If there is a matrix element of "0", the control proceeds to step 608.

At step 608, arrangement determining unit 502 overwrites every matrix element having the value "0" on the left side of the matrix element as the object of processing, with the value of matrix element as the object of processing.

At step 610, arrangement determining unit 502 determines whether or not the process described above has been completed on every matrix element. If it is determined to be completed, the control proceeds to step 602. Otherwise, the control proceeds to step 612.

At step 612, arrangement determining unit 502 shifts the matrix element as the object of processing. Specifically, arrangement determining unit 502 sets a matrix element on the right side of the most-recently processed matrix element and, thereafter, the control returns to step 604. If the most-recently processed matrix element is on the right end, arrangement determining unit 502 sets a matrix element on the left end of immediately lower row.

By the process described above (hereinafter referred to as left side process), in the matrix, a value other than "0" is written to any matrix of "0" on the left side of matrix element having the value other than "0". The matrix in the middle of the left side of FIG. 13 shows a state in which "7" is written to the matrix elements (0, 0) and (1, 0). The matrix at the lower left side of FIG. 13 shows a state in which "2" is further written to the matrix element of (0, 2). The matrix on the upper right side of FIG. 13 shows a state in which "4" is further written to the matrix element of (2, 2).

Next, arrangement determining unit 502 further executes a process of writing a value other than "0" to any matrix element of "0" on the right side of the matrix element that initially has the value other than "0" (hereinafter referred to as a right side process), in the similar manner as described above. Specifically, arrangement determining unit 502 executes the process corresponding to the process executed at steps 606 and 608 above with the side changed from "left" to "right," at steps 614 and 616. Except for this point, the process is the same as the left side process described above and, therefore, description will not be repeated.

If video signals are input as shown in FIG. 11, even when the right side process is executed, the value of each matrix element does not change, as shown by the matrix on the upper right side of FIG. 13 (matrix immediately after completion of the left side process).

Next, at step 618, arrangement determining unit 502 successively executes the process of writing a value other than "0" to any matrix element of "0" on the upper side of a matrix element having a value other than "0" and the process of writing a value other than "0" to any matrix element of "0" on the lower side of a matrix element having a value other than "0". These processes are the same as the left side and right side processes described above. Specifically, arrangement determining unit 502 executes the process of steps 600 to 612 with "left side" of steps 606 and 608 changed to "upper side" and, thereafter, executes the process of steps 600 to 612 with "left side" of steps 606 and 608 changed to "lower side." Except for this point, the process is the same as the left side process and, therefore, description thereof will not be repeated.

The matrix in the middle of the right side of FIG. 13 shows a state in which "2" is written to matrix elements of (0, 1) and (1, 1) by the upper side process. The matrix at the lower right side of FIG. 13 shows a state in which "4" is written to matrix elements (2, 1) and (3, 2) by the upper side process. If the video signals are input in the manner as shown in FIG. 11, when the upper side process ends, all matrix elements come to have a value other than "0" and, therefore, the value of each matrix element does not change even if the lower side process is executed.

As described above, in multi-display system 500, arrangement determining unit 502 can determine the video signal to be displayed on each display device. If the video signals are input in the manner shown in FIG. 11, the arrangement is determined as shown by the matrix of lower right side of FIG. 13. The matrix representing the correspondence between the display device and the video signal to be displayed corresponds to the look-up table Input (m, w, h) for specifying which of the video signals input to MUX 524 is to be used, described with reference to the first embodiment.

Once the matrix indicating the correspondence between the display device and the video signal to be displayed is determined, the display layout is determined such that one video image as a whole is displayed on the rectangular area formed by the matrix elements having the same value. Specifically, arrangement determining unit 502 determines magnification of each video image, and on an enlarged frame, determines positions of partial areas to be displayed by respective display devices. These are determined in the similar manner as Enlarge (m, w, h) and Position (m, w, h) in the first embodiment. Here, in multi-display system 500, information related to the direction of displaying the video image (erected or inverted) is added for the display device corresponding to the distributor receiving the video signal, so that an erected video image is displayed when viewed from nearest outer side. The information related to the direction of displaying video image may be provided in the similar manner as described with reference to FIG. 6. Specifically, in one of Enlarge (m, w, h) and Position (m, w, h), negative/positive sign may be used as the information indicating the direction of displaying the video image. The information representing the direction of displaying video image may be provided separately.

Arrangement determining unit 502 transmits the pieces of information (Input (m, w, h), Enlarge (m, w, h), Position (m, w, h)) determined as described above to CPU 514 of each display device 510. In response, each CPU 514 controls MUX 524 to output the signal of the input port corresponding to Input (m, w, h). Further, CPU 514 sets Enlarge (m, w, h) as the magnification and Position (m, w, h) as the position information of the data area to be used on the enlarged frame, in the signal processing unit. Using these values, signal processing unit 516 enlarges part of the video data input from MUX 524 on the memory, and generates the signal to be output to display unit 520 from the enlarged video data. Thus, the video images are displayed in the determined layout, on multi-display system 500.

Figure 14:
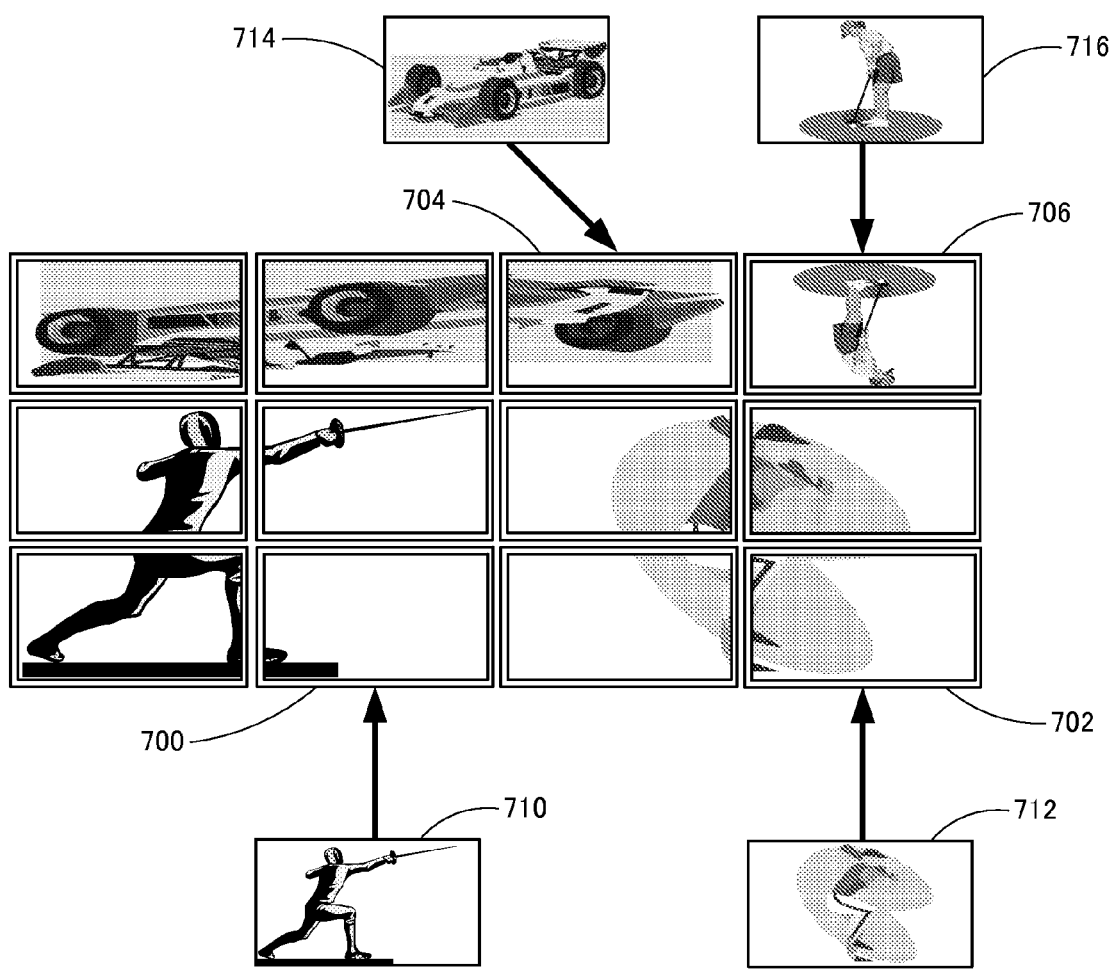
FIG. 14 shows a screen image displayed corresponding to the video inputs of FIG. 11.

By way of example, if video signals are input as shown in FIG. 11, in accordance with the matrix on the lower right side of FIG. 13, the display of multi-display system 500 will be as shown in FIG. 14. If only one video image is input, the display on multi-display system 500 will be as shown in FIG. 4. When two video signals are input, the display on multi-display system 500 will be as shown in FIG. 5, FIG. 6 or FIG. 7, depending on the input position of the video signals.

Thereafter, as in the first embodiment, if the input of a video signal or signals to each distributor changes (input to a distributor to which a video signal has been input is stopped, or input to a distributor to which a video signal has not been input starts), arrangement determining unit 502 again executes the process of steps 600 to 618 to newly determine a display layout, and transmits new pieces of information (Input (m, w, h), Enlarge (m, w, h), Position (m, w, h)) to each CPU 514. Consequently, the display on multi-display system 500 is automatically changed in accordance with the change in input video signals.

As described above, if a plurality of users input video signals to multi-display system 500, the video images can be displayed in an appropriate display layout using all screen images of multi-display system 500 in accordance with the positions (corresponding to the user positions) where the video signals are input.

Though an example having one arrangement determining unit 502 has been described as the second embodiment, the example is not limiting. As in the first embodiment, each display device may be provided with the arrangement determining unit. In that case, provided that each arrangement determining unit is capable of obtaining information related to presence/absence of signal input to all distributors, each arrangement determining unit can determine the display layout in the similar manner as described above.

Though an example in which each display device is provided with the arrangement determining unit has been described as the first embodiment, the example is not limiting. As in the second embodiment, the arrangement determining unit may not be provided for each display device but one arrangement determining unit may be provided for the multi-display system as a whole.

The display arrangement of multi-display system is not limited to 3×4 (h×w), and it may be of any other configuration.

Further, the arrangement of a plurality of displays forming the multi-display system is not limited to the arrangement that forms one rectangular video display screen (display screen) as a whole. What is required is simply that the plurality of displays form one video display screen as a whole, and the thus formed video display screen may have any shape. Here, "form one video display screen" means that one video image can be displayed as a whole.

In the second embodiment, an example has been described in which the video signal closer to the lower left side of video display screen of multi-display system has higher priority, that is, a larger video image is displayed if the input position of the video signal is closer to the lower left side of the video display screen. The example, however, is not limiting. A video signal closer to the lower right, upper left or upper right side of the video display screen of multi-display system may be given priority.

In the display layout of FIGS. 2 and 6, display of two video images in the same size is not limiting. The two video images may be displayed in different sizes. By way of example, video image 302 may be displayed in 3×3 (h×w) size and the video image 304 may be displayed in 3×1 (h×w) size. The same applies to the example of FIG. 6.

The input of video signals to each distributor is not limited to input in wired manner, and the signals can be input in wireless manner. By way of example, digital data of video images (MPEG2 or the like) may be input to the multi-display system using radio wave of 2.4 GHz band. If a plurality of video images are to be simultaneously input, the distributors should be adapted to receive the video signals at different channels.

In the second embodiment, if video signals are input in wireless manner, a wireless receiver may be arranged close to the display device in place of the input terminal to the distributor, and depending on the reception intensity, a channel to be used for communication may be automatically allocated to the portable computer or the portable terminal of the user as the source of video image. Further, the wireless receiver corresponding to the input terminal to the distributor may not be provided close to the display device. If a wireless channel in one-to-one correspondence with the display device to which the input terminal for receiving the video signal has been arranged in the embodiment above is determined and the user can recognize the wireless channel that corresponds to the display device in front of the user, it is possible for the user to set the communication channel for the portable computer or the portable terminal.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A multi-display system provided with a plurality of display devices, comprising:

a receiving unit having a plurality of video signal distributors, each being specified by a distributor number and being capable of receiving an input video signal;

a display layout determining unit for determining, in accordance with a number of the input video signals inputted to said plurality of video signal distributors and the distributor numbers, a display layout of video images generated from each of said input video signals, said video images being displayed on a video display screen formed by said plurality of display devices; and said plurality of display devices, each for generating a video image from said plurality of input video signals and displaying the video image on said video display screen, in accordance with said determined display layout, wherein said video display screen formed by said plurality of display devices is arranged horizontally, when one video image is displayed on said video display screen as a whole, the number of said plurality of video signal distributors is the same as the number of display devices forming upper and lower ends of the image, each of said plurality of video signal distributors is positioned close to the corresponding one of said plurality of display devices forming the upper and lower ends, and said display layout is determined such that when a number of the plurality of input video signals inputted to said plurality of video signal distributors is less than a number of the plurality of display devices, a video image generated from the input video signal inputted to said video signal distributor is displayed on the display device corresponding to said video signal distributor receiving the input video signal and at least one display device which is adjacent to the display device corresponding to said video signal distributor receiving the video signal and does not have a video signal inputted to the corresponding video signal distributor.

2. The multi-display system according to claim 1, wherein said display layout is determined by information specifying a video signal used for generating a video image displayed by each of said display devices, from said input video signals, information specifying, in a video image as a whole corresponding to the video signal used by each of said display devices, an area of the video image displayed by each of said display devices, and information specifying magnification of said area of the video image displayed by each of said display devices.

* * * * *